(12) United States Patent
Collinsworth et al.

(10) Patent No.: US 8,186,564 B1
(45) Date of Patent: May 29, 2012

(54) BRAZING PREFORM MANUFACTURE (75) Inventors: Randall Collinsworth, New Market, TN (US); Hideyo Omyo, Knoxville, TN (US); Mike Tyler, Sevierville, TN (US)

(73) Assignee: Exedy America Corporation, Mascot, TN (US)

( * ) Notice: Subject to any disclaimer, the term of this patent is extended or adjusted under 35 U.S.C. 154(b) by 0 days.

(21) Appl. No.: 12/986,775

(22) Filed: Jan. 7, 2011

(51) Int. Cl.
*B23K 35/14* (2006.01)
*B21C 1/00* (2006.01)
*B21D 22/00* (2006.01)

(52) U.S. Cl. ............. 228/56.3; 29/524; 72/274; 72/352
(58) Field of Classification Search .................. None
See application file for complete search history.

(56) References Cited

U.S. PATENT DOCUMENTS

| | | | | |
|---|---|---|---|---|
| 2,266,692 A | * | 12/1941 | Olson | 277/441 |
| 2,471,650 A | * | 5/1949 | Pandolfi | 206/389 |
| 2,803,210 A | * | 8/1957 | Lohman | 269/52 |
| 3,491,934 A | * | 1/1970 | Foote | 228/56.3 |
| 4,688,953 A | * | 8/1987 | Koch et al. | 384/615 |
| 6,164,517 A | * | 12/2000 | Kim | 228/56.3 |
| 6,177,644 B1 | * | 1/2001 | Wilkie et al. | 219/69.17 |
| 6,186,390 B1 | * | 2/2001 | Tadauchi et al. | 228/56.3 |
| 6,538,201 B1 | * | 3/2003 | Gretz | 174/655 |
| 7,083,204 B1 | * | 8/2006 | Miller et al. | 285/293.1 |
| 2007/0251602 A1 | * | 11/2007 | Gagnon et al. | 148/26 |
| 2009/0014093 A1 | * | 1/2009 | Campbell et al. | 148/24 |
| 2009/0188092 A1 | * | 7/2009 | Teresiak | 29/8 |
| 2009/0200363 A1 | * | 8/2009 | Means et al. | 228/246 |
| 2010/0122997 A1 | * | 5/2010 | Liu | 228/203 |
| 2010/0223763 A1 | * | 9/2010 | Shilale et al. | 24/16 PB |
| 2011/0068149 A1 | * | 3/2011 | Hirano et al. | 228/56.3 |

FOREIGN PATENT DOCUMENTS

JP 01-083397 A * 3/1989

* cited by examiner

*Primary Examiner* — Kiley Stoner
(74) *Attorney, Agent, or Firm* — Luedeka Neely Group, PC (57) ABSTRACT

A method and apparatus for forming a brazing preform. The preform is made utilizing a brazing preform member having a first shaped end and a second shaped end. The first and second shaped ends are mated in a friction fit without any welding to provide the brazing preform.

2 Claims, 8 Drawing Sheets

BRAZING PREFORM MANUFACTURE

FIELD

This disclosure relates to the field of brazing preforms. More particularly, this disclosure relates to the manufacture of rings from wire in an automated manner that avoids handwork and results in a more efficient manufacture of rings and reduced waste.

BACKGROUND

Brazing preforms are pre-shaped objects of brazing material that are placed in an assembly prior to the heating cycle of a manufacturing process, and which melt in the heating cycle for the desired brazing. For example, in the manufacture of torque converters, ring shaped brazing preforms typically made of copper wire are used to attach turbine blades to the turbine drum in the manufacture of the torque converter drums. That is, the blades are positioned as desired, a brazing ring is positioned around the blades, and the drum is heated to melt the copper to braze the blades to the drum body in the desired positions. Typically, such rings have a diameter of from about 7 to about 12 inches, depending on the size of the torque converter.

The use of brazing preforms, such as copper rings, is advantageous to reduce the need for hand working in the manufacturing process and to more accurately control the amount of brazing material used and its distribution. The use of preforms is also advantageous in the automation of brazing processes. However, the manufacture of brazing preforms, particularly relatively large diameter rings made of relatively small diameter wire, typically involves handwork in joining the ends of the wire to make the ring, such as by crimping or welding. Conventional processes process wire to form a ring having planar ends from a straight cut or shear made to the wire. These planar ends are then aligned and held adjacent one another for welding or crimping. Attempts to automate this process results in a significant number of poor welds or unaligned ends which are unsuitable for use as brazing rings, resulting in substantial waste in the manufacture of the rings. Alternatively, preforms in the form of incomplete rings, e.g., rings with the ends unjoined, are used. The need for handwork to make complete rings is not cost effective and the use of incomplete rings is undesirable to the manufacturing process.

The present disclosure advantageously provides methods and apparatus for the automated manufacture of brazing preforms and, in particular, large diameter complete rings made of small diameter wire.

SUMMARY

The above and other needs are met in one aspect of the disclosure by a method of forming a brazing preform, The method includes the steps of providing a brazing preform member from a length of preform material and configuring the preform member to have a first shaped end and a second shaped end. In another step the first and second shaped ends are mated in a friction fit without any welding to provide the brazing preform.

In another aspect, the disclosure relates to brazing preforms.

In an additional aspect, there is provided a method of forming rings from wire.

In a further aspect, the disclosure relates to wire rings.

The disclosure also relates to apparatus for forming wire rings suitable for use as brazing preforms.

The apparatus includes an infeed of wire for conversion by the apparatus into a plurality of wire rings, each ring being formed using the apparatus to have a first shaped end and a second shaped end, with the first and second shaped ends being mated in a friction fit by the apparatus without any welding to provide each wire ring.

The apparatus also includes a punch having a raised rib, a first actuator associated with the punch for movement of the punch toward the die, a die, a block adjacent the die, and a second actuator associated with the block for bearing the block against the die.

The die is located adjacent the punch and has a groove configured to receive the rib of the punch and a guide slot defined on a lower surface of the die and across the width of the lower surface of the die for passage of the wire through the die and for positioning the wire adjacent the groove so that the wire can be acted on by the rib of the punch to form the first and second shaped ends.

The second actuator is operated to urge the block against the die and a leading end of the wire is fed into the slot of the die such that the wire is below the groove of the die, after which the first actuator is operated to move the punch so that the rib of the punch is urged through the wire to form the second shaped end on the wire.

The wire is coiled around 360 degrees such that the second shaped end feeds into an opening between the die and the block. The first actuator is thereafter operated to form a second shaped end on the new leading edge of wire below the groove of the die while also forming the first shaped end on the coiled wire, which is pushed upward to mate with the previously formed second shaped end and thereby produce a wire segment having the first and second shaped ends on the opposite ends of the wire segment, with the first and second shaped ends being mated by the apparatus in a friction fit without welding to provide the ring.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
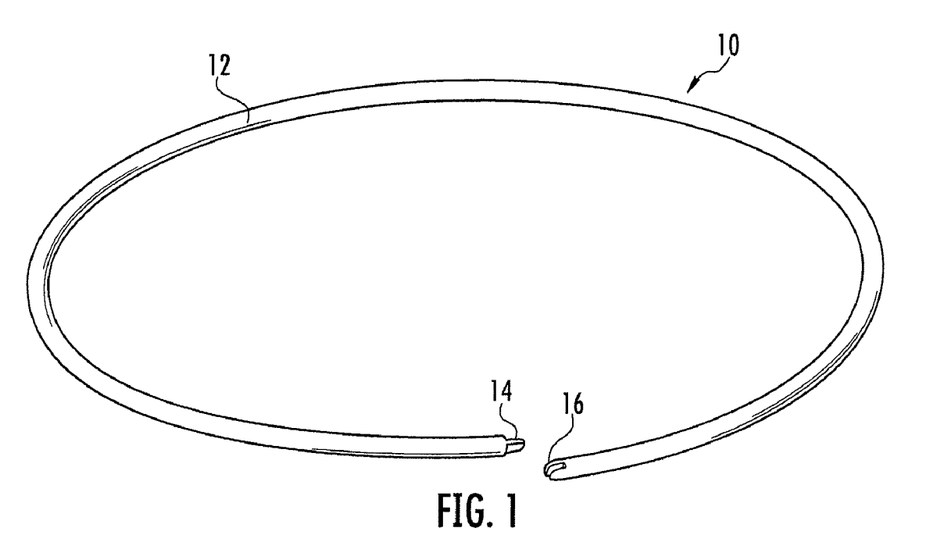
FIGS. 1 and 2 show a brazing ring according to the disclosure prior to the ends thereof being mated.
Figure 2:
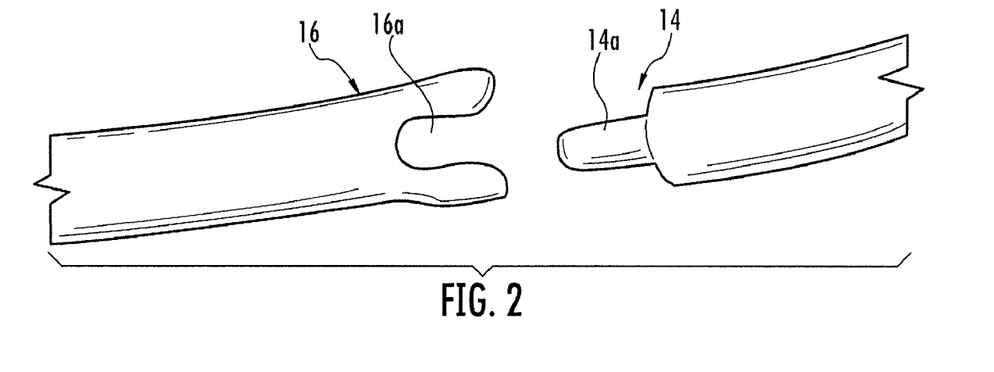
Figure 3:
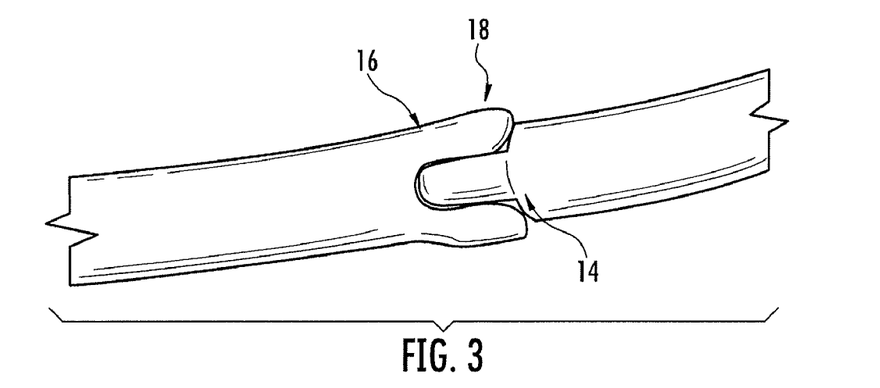
FIG. 3 shows the shaped ends of the brazing ring of FIGS. 1 and 2 mated to provide a complete ring.

With initial reference to FIGS. 1-3, the disclosure relates to the manufacture of a ring 10 which is made from a length of wire 12 and formed by processing the wire 12 to curl the wire into a ring shape having a first shaped end 14 and a second shaped end end 16 which are mated to form a union 18 that renders the ring 10 to be a continuous ring. In a preferred embodiment, the ring 10 is made of a copper wire and is suitable for use as a brazing preform.

The ring 10 may be made to have virtually any diameter. The formation of the rings 10 in diameters of from about 7 to about 12 inches is preferred for use in the manufacture of brazing rings for use in the manufacture of torque converters. For the purpose of example, the wire 12 for brazing ring uses may be a copper wire having a diameter of about ⅛ inch. However, the wire may be of other materials and of smaller or larger diameter.

The shaped ends 14 and 16 are "shaped" in that they are not planar in the manner of a shear end made by a straight cut or shear of the wire 12. The first shaped end 14 is preferably shaped to provide a projection 14a and the second shaped end 16 is preferably shaped to provide a cavity 16a configured to matingly receive the projection 14a of the first shaped end 14. In this manner, the first shaped end 14 and the second shaped end 16 may be provided in compatible shapes to enable formation of the union 18 by mating of the ends 14 and 16 in a friction fit without any welding. As described below, the ends 14 and 16 are shaped and joined by automated apparatus to result in the ring 10 that is a continuous ring.

The wire 12 is processed in an automated and continuous manner to curl the wire 12, provide the shaped ends 14 and 16, and join the ends 14 and 16 into the union 18 by use of an apparatus 20, shown in FIGS. 4-8.

Figure 4:
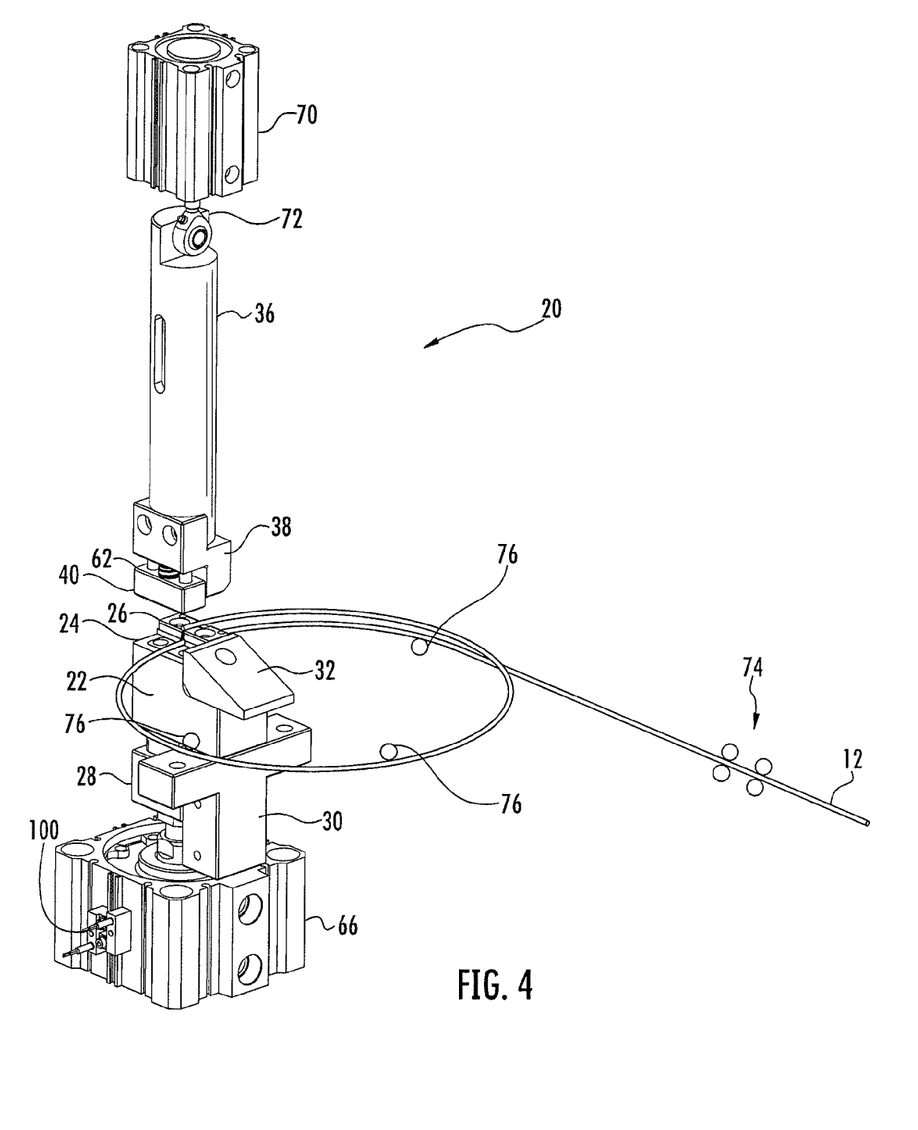
FIG. 4 is a perspective view of an assembled apparatus for automated manufacture of rings according to the disclosure.
Figure 5:
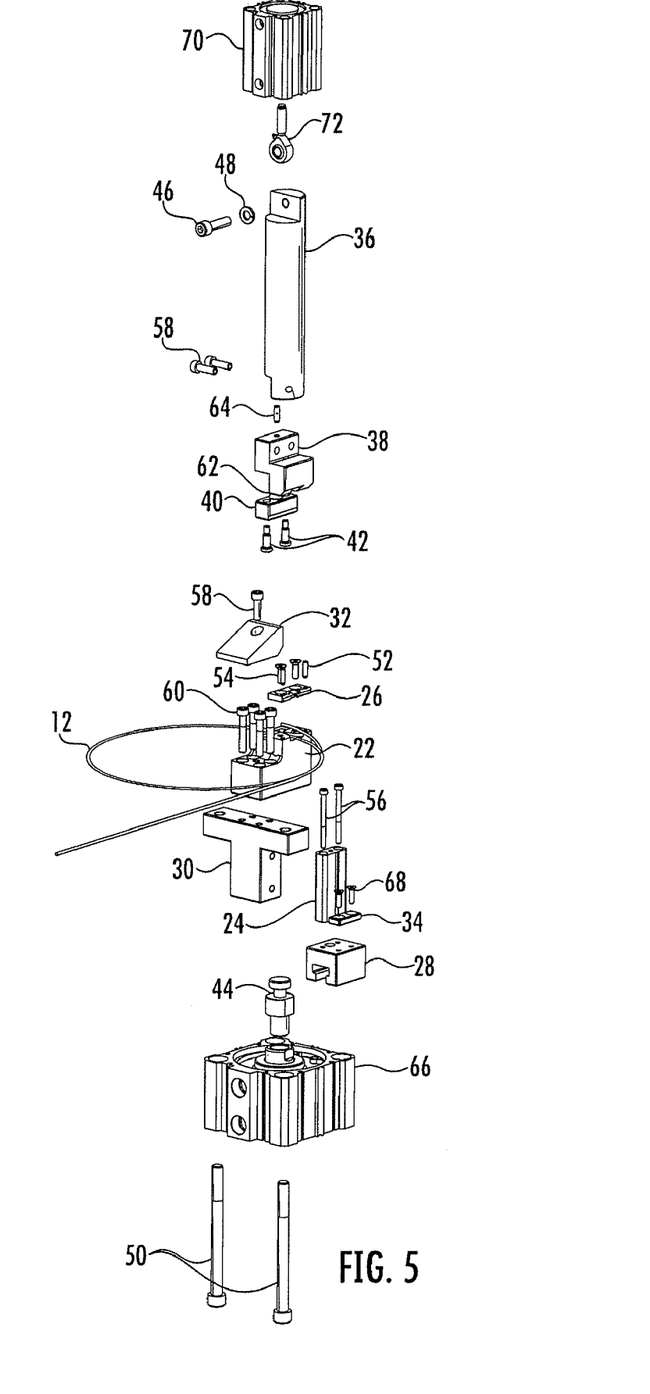
FIG. 5 is an exploded perspective view of the apparatus of FIG. 4.
Figure 6:
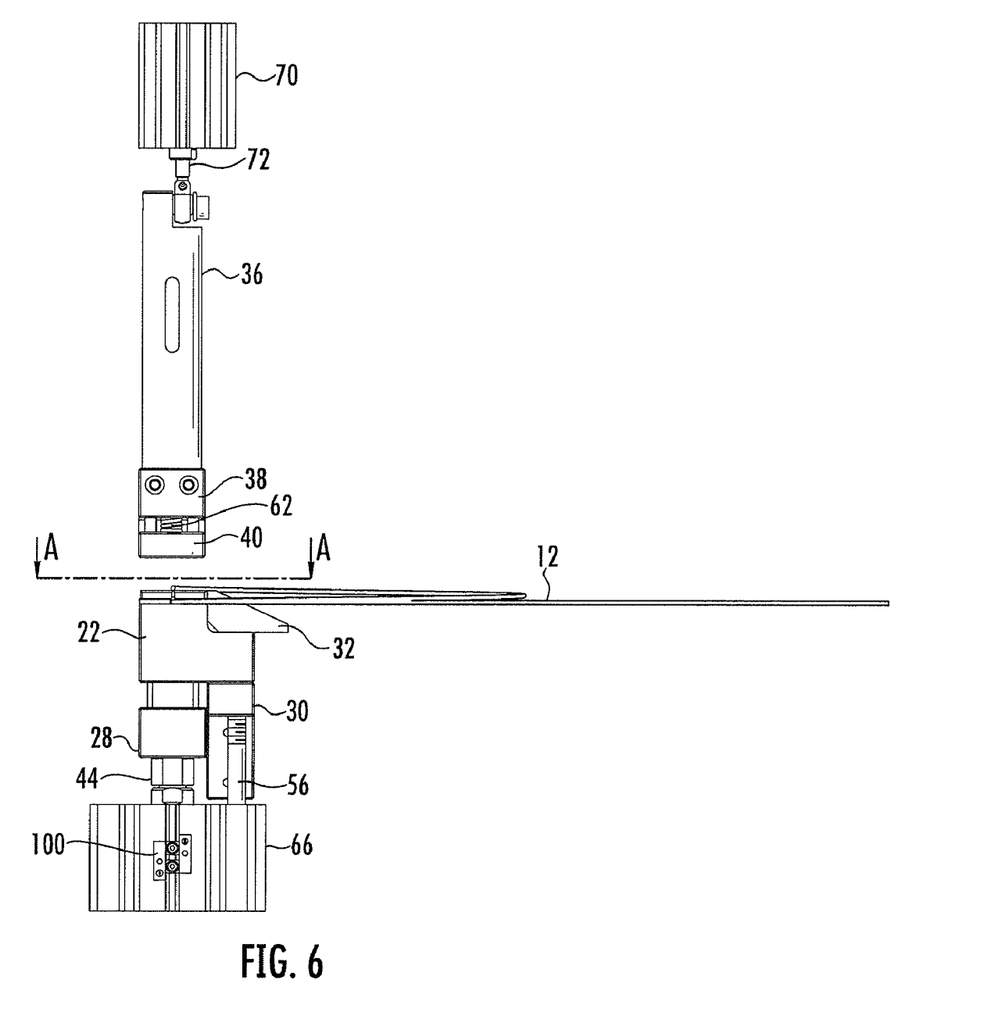
FIG. 6 is a side view of the apparatus of FIG. 4.

The apparatus 20 includes a punch retainer 22, a punch 24, a die 26, a joint 28, a block 30, a support 32, a punch stop block 34, an upper shaft 36, an upper crimp block 38, a an upper stop block 40, a shoulder bolt 42, an air cylinder connector 44, a cap screw 46, a lock washer 48, cap screws 50, dowel pins 52, screws 54, cap screws 56, 58 and 60, compression spring 62, dowel pins 64, lower air cylinder 66, screws 68, upper air cylinder 70, and rod end bearing 72.

A bulk roll of the wire 12 is provided adjacent the apparatus 20 to supply the wire 12, and the wire 12 from the roll is decoiled as by a decoiler such as a decoiler available under model number PR4MS from P/A Industries Inc. of Bloomfield, Conn. A motor controller may be used to control the decoiler, such as a controller available under model number MM23201C available from Minark Drives of South Beloit, Ill.

The decoiled wire fed through a tensioning roller system, generally indicated at 74, is to maintain a desired tension on the wire 12 as it is fed to the apparatus 20. A coil forming system, generally indicated at 76, is provided to guide the wire 12 to form a coiled or circular shape as it is fed through the apparatus 20. The tensioning roller system 74 may be a conventional wire tensioning system having various roller sets configured to straighten and maintain a desired tension on the wire as it is fed to the apparatus 20. The coil forming system 76 may be a conventional coil forming system having a plurality of roller sets configured to receive a wire feed and coil it to a desired radius.

Figures 7, 8:
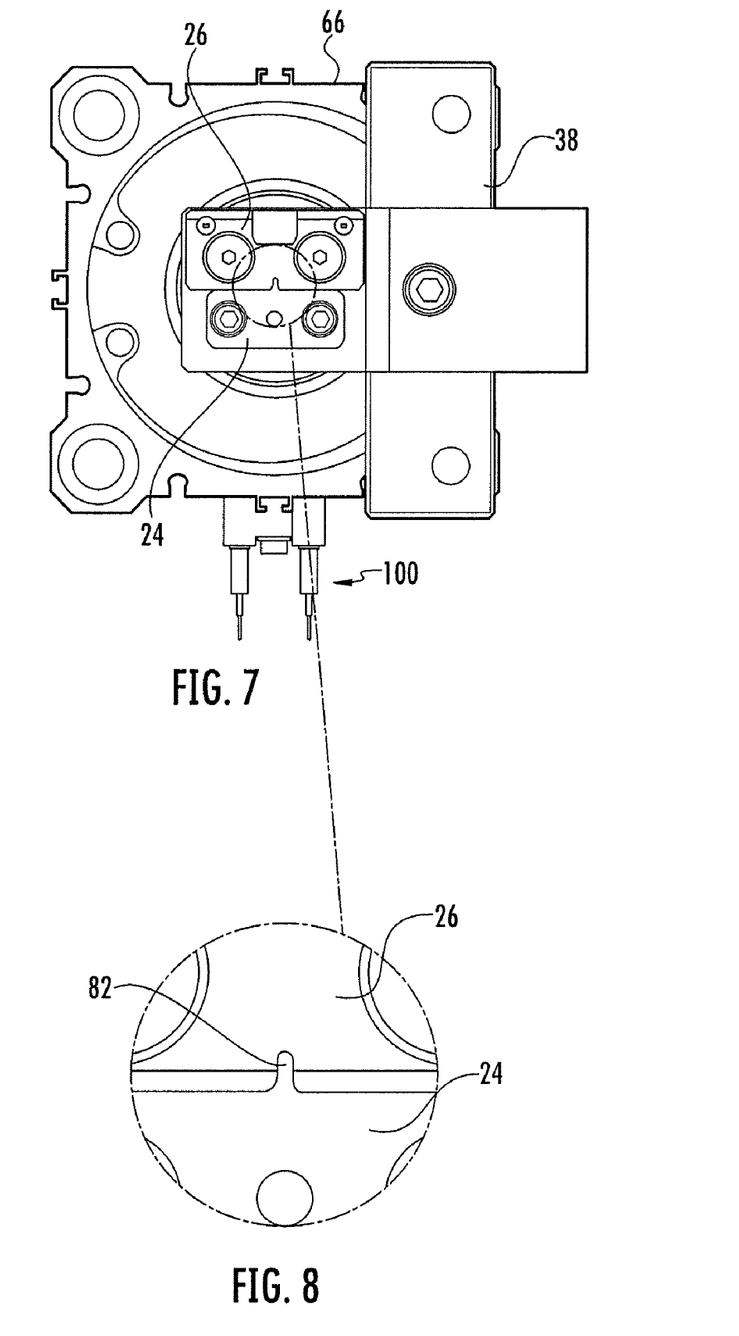
FIG. 7 is a cross-sectional view taken along line A-A of FIG. 6.
FIG. 8 is a detailed view of a portion of FIG. 7.
Figure 9:
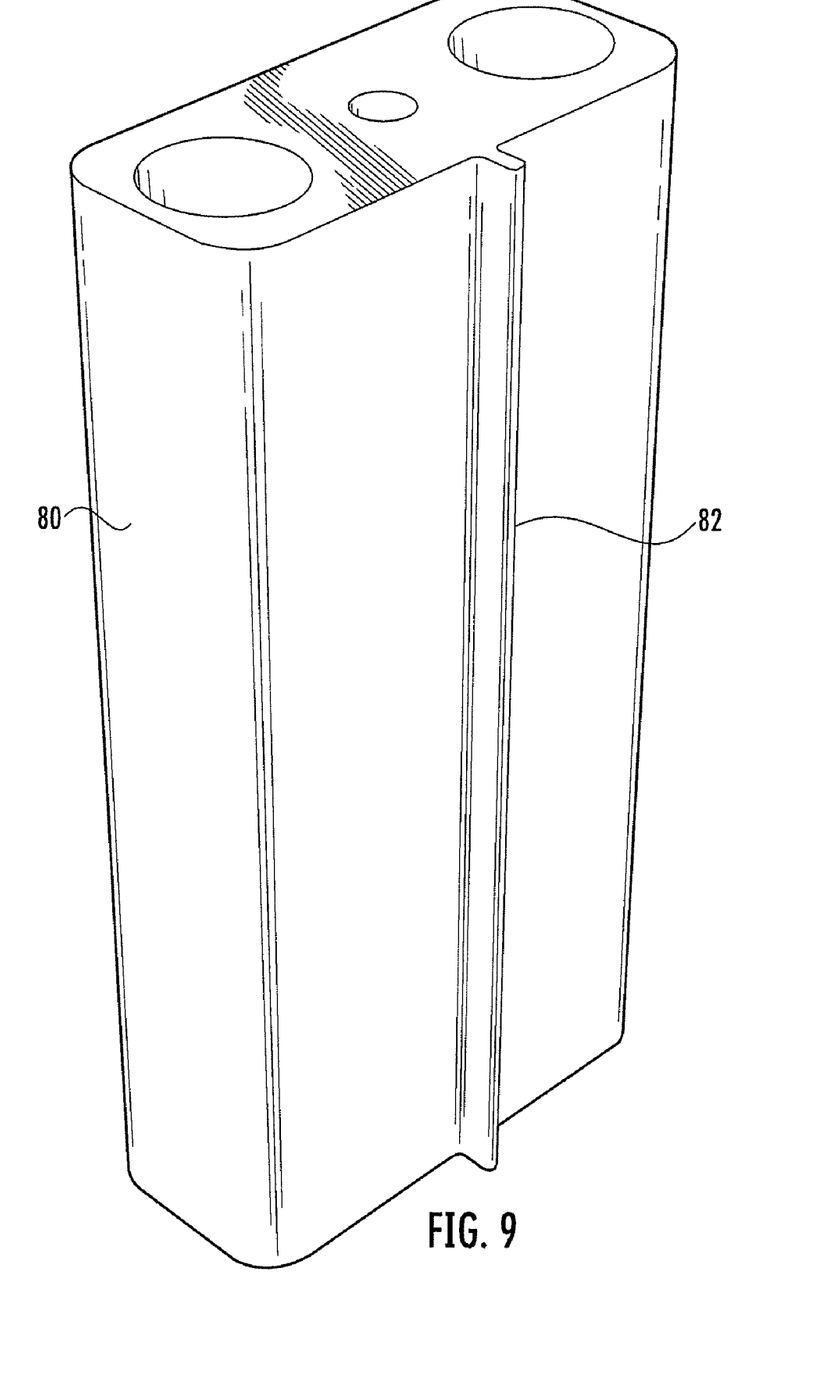
FIG. 9 is a perspective view of a punch component of the apparatus of FIG. 4.
Figure 10:
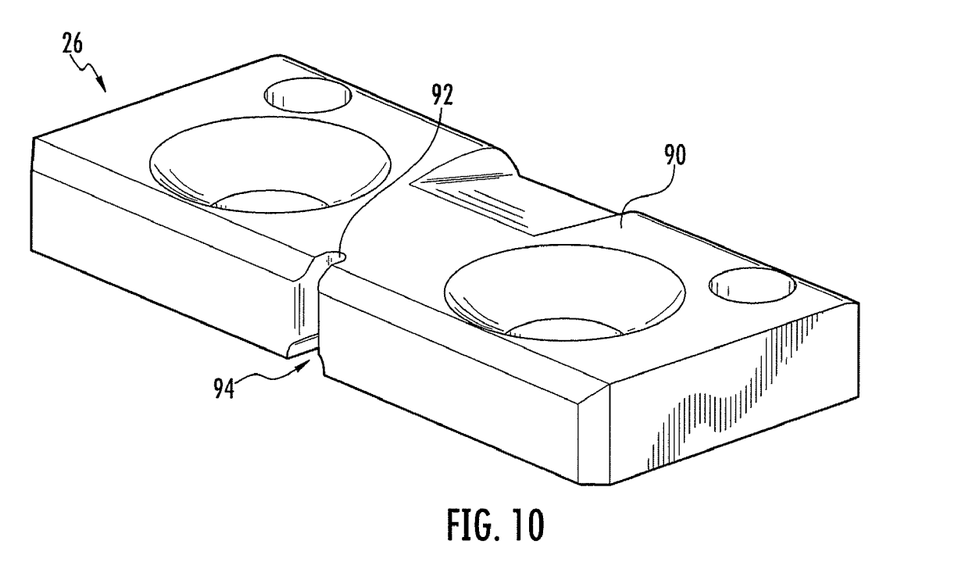
FIG. 10 is an upper perspective view of a die component of the apparatus of FIG. 4 that cooperates with the punch component to provide the shaped ends of the brazing ring of FIGS. 1-3.
Figure 11:
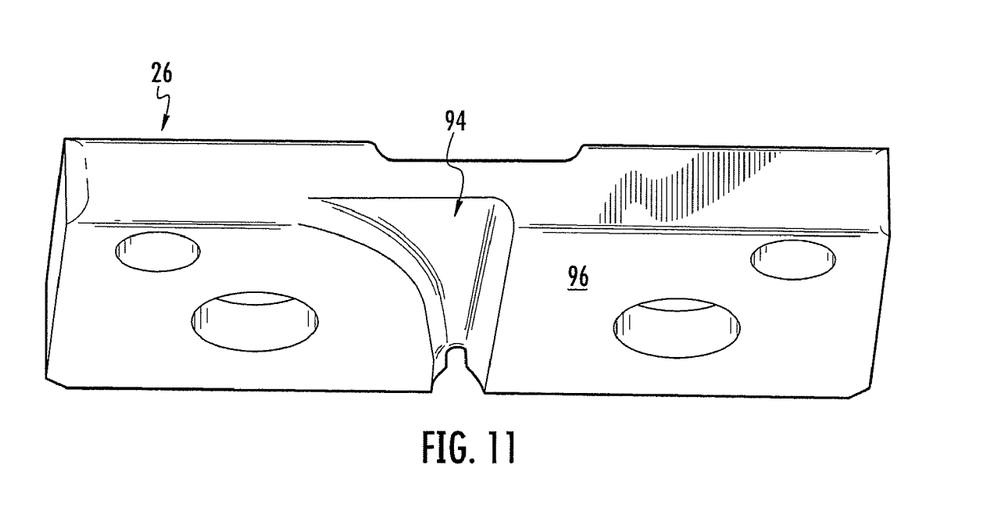
FIG. 11 is a lower perspective view thereof.

The shaped ends 14 and 16 are formed utilizing the punch 24 and the die 26, the structures of which are seen in more detail in FIGS. 7 and 8. The punch 24, as seen in FIG. 9, is provided by an elongate rectangular body 80 having a centrally located longitudinal raised rib 82 on an exterior surface thereof. The die 26, as seen in FIGS. 10 and 11, has a generally rectangular body 90 having a vertical groove 92 defined on a leading edge thereof configured to receive the rib 82 of the punch 24. A tapered guide slot 94 is defined on lower surface 96 of the die 26 and across the width of the lower surface 96 for passage of the wire 12 through the die 26 and for positioning the wire 12 adjacent the groove 92 so that the wire 12 can be acted on by the rib 82 of the punch 24 to form the shaped ends 14 and 16. The slot 94 expands in dimension away from the groove 92 and is curved to guide the wire 12 into the desired ring shape in cooperation with the coil forming system 76.

The apparatus 20 operates to initially receive a wire feed, to shape the leading end of the wire to have the shaped end 16, coil the wire, then cut the wire to define a trailing end and form the shaped end 14 thereon and join the shaped ends 14 and 16 into the union 18, forming the ring 10. Simultaneous with this, the new leading end of the wire feed, formed when the wire is cut, is shaped to provide a shaped end 16 thereon and the process repeated on a continuous basis as each ring 10 is formed. Thus, it will be understood that operation of the apparatus 20 to provide the rings 10 includes an initial load cycle, followed by an automatic cycle in which the apparatus 20 continuously operates to produce the rings 10.

In the initial load cycle, the upper air cylinder 70 is actuated down against the top of the die 26. Next, the wire 12 is fed through the forming rollers 74 and into the slot 94 of the die 26 such that the wire 12 is below the groove 92 of the die. After this, the punch 24 is actuated to urge the rib 82 through the wire 12 to cut the second shaped end 16 in the wire 12, compressing the spring 62 of the upper stop block 40 in the process. Thereafter, the punch 24 is actuated back down to its home position. The upper air cylinder 70 may also be actuated back to its home position.

In the automatic cycle, the upper air cylinder 70 actuates down so that the upper crimp block 38 is disposed against the top of the die 26. Wire is fed through the forming rollers and through the die 26 via the slot 94 such that the second end 16 of the wire is coiled around approximately 360° to form a circle. The second shaped end 16 of the wire feeds into an opening above the die 26 defined between the die 26 and the upper crimp block 38 and stops against the upper stop block 40. The punch 24 is then actuated up to simultaneously form the first shaped end 14 on the wire that has been formed into a circle and form another second shaped end in the end of the new wire then located in the slot 94. The upwardly moving punch compresses the spring 62 moving upper stop block 40 upwardly. The newly formed first shaped end 14 of the coiled wire is also pushed upward by the top surface of the punch into the second shaped end 16 of the coiled wire to crimp and mate the first and second shaped ends together between the punch 24 and the upper crimp block 38 to form the union 18, creating a formed ring. The formed ring 10 drops onto a receiving surface and a mechanical transfer system, such as a conveyor or loading arm, moves the formed ring to an exit chute. The auto cycle is repeated with the newly formed second end being fed out of the slot 94.

Operation of the apparatus is controlled as by a programmable logic controller or other computer control system. In this regard, sensors may be utilized with several of the components to provide information about their status to the controller, such as auto switches 100 associated with the actuator 66 to relay the position of the actuator, e.g., extended or retracted, to the controller.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. Apparatus for forming a length of wire into a ring, the apparatus comprising:

an infeed of wire for conversion by the apparatus into a plurality of wire rings, each ring being formed using the apparatus to have a first shaped end and a second shaped end, with the first and second shaped ends being mated in a friction fit by the apparatus to provide each wire ring;

a punch having a raised rib;

a first actuator associated with the punch for movement of the punch in relation to the die;

a die located adjacent the punch and having a groove configured to receive the rib of the punch and a guide slot defined on the die and across the width of the die for passage of the wire through the die and for positioning the wire adjacent the groove so that the wire can be acted on by the rib of the punch to form the first and second shaped ends;

a block adjacent the die; and a second actuator associated with the block for bearing the block toward the die;

wherein the second actuator is operated to urge the block against the die and a leading end of the wire is fed into the slot of the die such that the wire is below the groove of the die, after which the first actuator is operated to move the punch so that the rib of the punch is urged through the wire to form the second shaped end on the wire and a first shaped end of a successive wire portion; and the second actuator is operated to bear the block against the top of the die to hold the first shaped end on the wire in position as the punch moves the second shaped end into a friction fit with the first shaped end and thereby produce a wire segment having the first and second shaped ends on the opposite ends of the wire segment, with the first and second shaped ends being mated by the apparatus in a friction fit to provide the ring.

2. The apparatus of claim 1, wherein the apparatus is operable to form wire rings that are suitable for use as brazing preforms.

* * * * *